(12) United States Patent
Miller et al.

(10) Patent No.: US 7,287,701 B2
(45) Date of Patent: Oct. 30, 2007

(54) HANDHELD COORDINATE REFERENCE SYSTEM

(75) Inventors: Gary E. Miller, Auburn, WA (US); William O. Price, Sammamish, WA (US); Kirk D. Skaggs, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 11/059,779

(22) Filed: Feb. 17, 2005

(65) Prior Publication Data

US 2006/0180648 A1   Aug. 17, 2006

(51) Int. Cl.
*G06K 7/10* (2006.01)
(52) U.S. Cl. .................. 235/472.01; 382/284
(58) Field of Classification Search ........... 235/472.01, 235/472.02, 472.03, 492; 701/1, 37, 45, 701/301; 382/284, 294; 342/357.14, 357.01
See application file for complete search history.

(56) References Cited

U.S. PATENT DOCUMENTS

| | | | |
|---|---|---|---|
| 6,650,287 B1* | 11/2003 | Karpov et al. ......... | 342/357.14 |
| 6,694,064 B1* | 2/2004 | Benkelman ................. | 382/284 |
| 2003/0236619 A1 | 12/2003 | Dorian et al. ............... | 701/213 |
| 2005/0278098 A1* | 12/2005 | Breed .......................... | 701/45 |
| 2006/0025897 A1* | 2/2006 | Shostak et al. ............... | 701/1 |

OTHER PUBLICATIONS

Technical Data Sheet, 3DM-G™, MicroStrain®, Best of Sensors Expo Spring 2002, 2pp.

* cited by examiner

*Primary Examiner*—Thien Minh Le
(74) *Attorney, Agent, or Firm*—Gates & Cooper LLP

(57) ABSTRACT

A method and apparatus for determining a spatial position of interest in an assembly is disclosed. In one embodiment, the method comprises the steps of determining a reference position of reference unit; moving the reference unit from the reference position to the first spatial position; inertially measuring a displacement of the reference unit while the reference unit is unilluminated by an illuminator; and determining the first position from the reference position, illuminator energy reflected from the reference unit, and the inertially measured displacement of the reference unit.

28 Claims, 7 Drawing Sheets

HANDHELD COORDINATE REFERENCE SYSTEM

BACKGROUND OF THE INVENTION

1. Field of the Invention

The present invention relates to systems and methods for accurate placement of components in or on assemblies, and in particular, to a system and method for augmenting a positioning system to precisely determine component locations in otherwise inaccessible areas.

2. Description of the Related Art

The production of large assemblies often requires precise placement of related components and subsystems. This can be accomplished with computer aided measurement systems (CAMS) that can survey and record point coordinates on the exterior or interior of an aircraft to generate a three-dimensional (3D) map of the assembly that can be compared to design specifications, especially those prepared by computer-aided design (CAD) techniques. Using such maps and a portable hand-held remote device, the precise spatial location for related components and subsystems can be determined by using the CAMS and the 3D map to direct the placement of the device, and hence, the desired location of the component.

Typically, CAMS include an illumination device such as a laser, a reflective object for reflecting the illumination, a receiver for receiving the reflective light, and a computer. The CAMS may be implemented by a LIDAR (light detection and ranging) system in which the illuminator rapidly scans the area of interest, and determines the spatial location of the reflective (and typically spherical) object using reflected energy received from the object. Typically, the reflective object is spherical, allowing the center of the reflective object to be easily determined. That is, the attitude of the reflective object is of no concern, as a light beam from the illuminator and the light beam reflected from the spherical object are substantially co-linear.

The CAMS may also be implemented by a laser tracker and a retro-reflector. Unlike the LIDAR system, the illuminator does not repeatedly scan the area of interest. Instead, using received reflected energy, the illuminator tracks the reflective object as it is moved around.

One advantage of such LIDAR systems is that they can easily reacquire track of objects that have passed through an area that is in the shadow of the illuminator, while laser tracking systems cannot readily reacquire track.

In both LIDAR and laser-tracker systems, the computer controls the laser to illuminate the reflector, and the receiver senses energy reflected from the illuminated reflective object. Since the computer is aware of the angular displacement of the illuminator and the time it takes for the light beam to bounce off of the reflector and return to the receiver, and can determine the spatial position and range of the features from the reflected energy. Since the reflective object can be placed against features of interest, the assembly can be precisely mapped.

However, this technique is limited to situations where there is a line of sight between the feature and the illumination device. Such systems are currently incapable of providing any information regarding placement in locations where the structure can not be illuminated (e.g. not in the line of sight of the illumination device and the receiver). Hence, the practicality of continuous and/or autonomous position awareness remains poor.

What is needed is a system and method for precise measurement and placement of components and systems on assemblies, even in places where such placement is at a location that is not illuminable by the illumination device of the CAMS. The present invention satisfies that need.

SUMMARY OF THE INVENTION

To address the requirements described above, the present invention discloses a method and apparatus for determining a spatial position of interest in an assembly. In one embodiment, the method comprises the steps of determining a reference position of reference unit; moving the reference unit from the reference position to the first spatial position; inertially measuring a displacement of the reference unit while the reference unit is unilluminated by an illuminator; and determining the first position from the reference position, illuminator energy reflected from the reference unit, and the inertially measured displacement of the reference unit. In another embodiment, the present invention is embodied in an apparatus comprising an inertial reference unit for inertially measuring a displacement of the reference unit, a reflector for reflecting energy from an illuminator; and a communications interface communicatively coupled to the inertial measurement unit, for communicating information between the reference unit and a processor controlling the illuminator.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
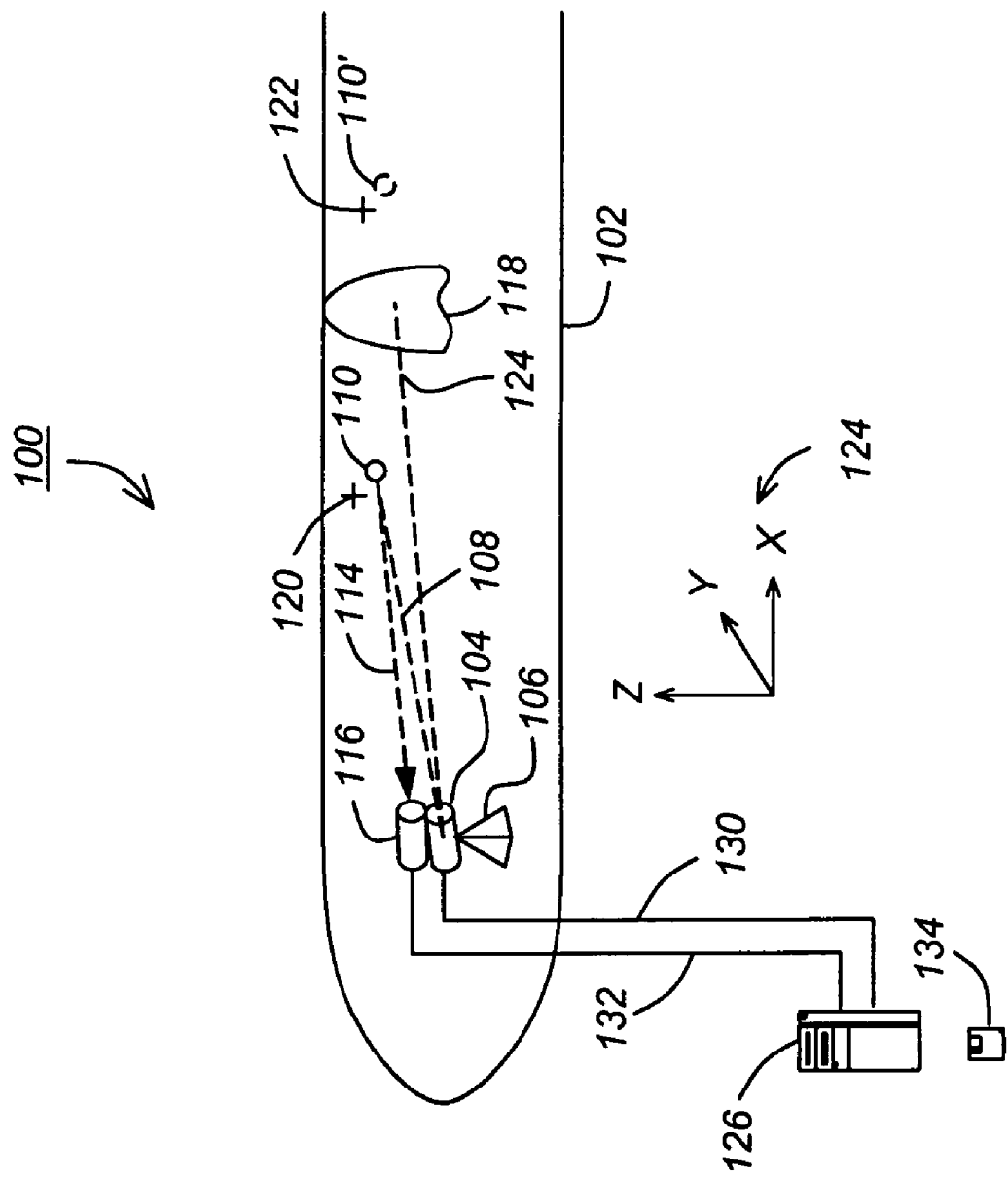
FIG. 1 is a diagram illustrating the use of a CAMS to generate and use a map of an assembly.

FIG. 1 is a diagram illustrating the use of a CAMS 100 to generate and use a map of an assembly 102. For illustrative purposes only, the assembly may be considered to be the interior of the fuselage of an aircraft. The CAMS 100 comprises a computer 126 an illumination device 104, and a receiver 116. Under control of the computed 126 via first communication link 130, the illumination device 104 illuminates features within the assembly 102, and the receiver 116 receives the illuminative energy reflected from these features and transmits information describing this energy to the computer 126 via second communication link 132. The computer 126 uses this information to determine the location of the features within the assembly 102. The computer 126 includes a processor and memory storing instructions executable by the processor for performing the tasks described herein. Instructions may also be stored on an external memory device 134, such as a compact disk (CD) or floppy disk.

In one embodiment, the energy emitted from the illuminator 104 is presented in a coherent narrow beam 108 (such as a light beam from a laser), which is slewed around the assembly 102. This can be accomplished electronically within the illuminator 104 itself, or with use of a steerable support structure such as pedestal 106. Electronic steering (using techniques similar to that which are used to scan conventional television screens) is preferred in cases where the assembly 102 is continuously scanned. Since the computer 126 either controls the scanning of the beam 108, or is implicitly aware of the beam's location (e.g. because scanning is performed in a predictable manner), the angular position of the feature (for example in assembly coordinate system 124) can be computed from the reflected illumination energy 114 received by the receiver 116 and sent to the computer 126. The range to the feature can be determined using doppler techniques, the magnitude of the reflected energy, or by examination of the time delay between the transmission and reception of the beam, for example by pulsing the beam and looking for phase shifts in the pulses of the returned energy.

The foregoing can also be accomplished in other ways. For example, the illuminator 106 can provide a wide beam of energy, and angular information can be instead obtained by angularly resolving the reflected illuminator energy 114, for example, by use of a receiver 116 that can determine the angle of the received energy, or by use of a receiver 116 and computer 126 that can image the assembly 102 from the reflected energy.

The position of any location of the assembly 102 can be determined via use of a portable reflecting device 110 having a surface that reflects the illuminator energy. This technique works well for locations that are in the line of sight of the illuminator (and hence, illuminated by the illuminator 104) such as location 120. However, at other locations, such as location 122, where the line of sight between the location 122 and the illuminator 104 is obscured by an object opaque to the energy to the illuminator. Placing the reflecting device 110 surface in that position (indicated as 110') will not result in useful measurements.

Figure 2:
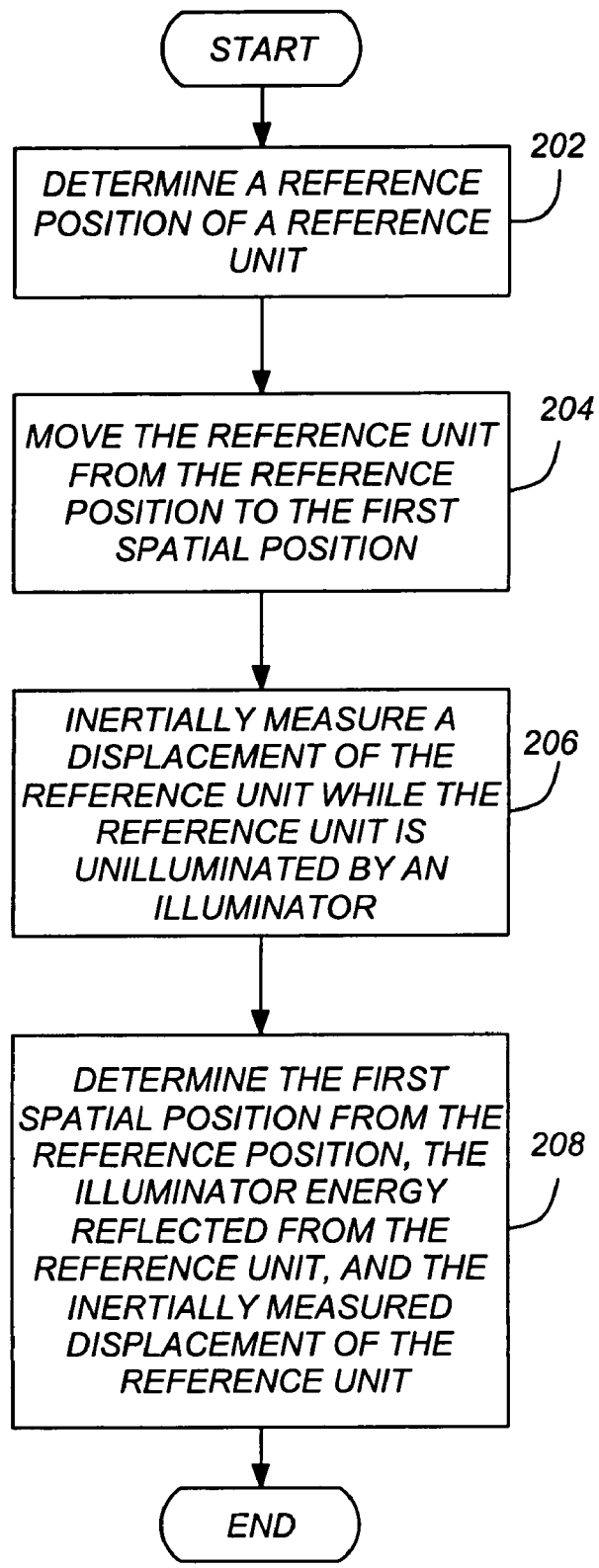
FIG. 2 is a flow chart presenting exemplary operations that can be used to augment the CAMS to provide measurements where the remote unit is unilluminated.

FIG. 2 is a flow chart presenting exemplary operations that can be used to ameliorate the foregoing problems. FIG. 2 will be discussed with reference to FIGS. 3A-3C, which follow. As shown in block 202, a reference position of a reference unit is determined.

Figure 3A:
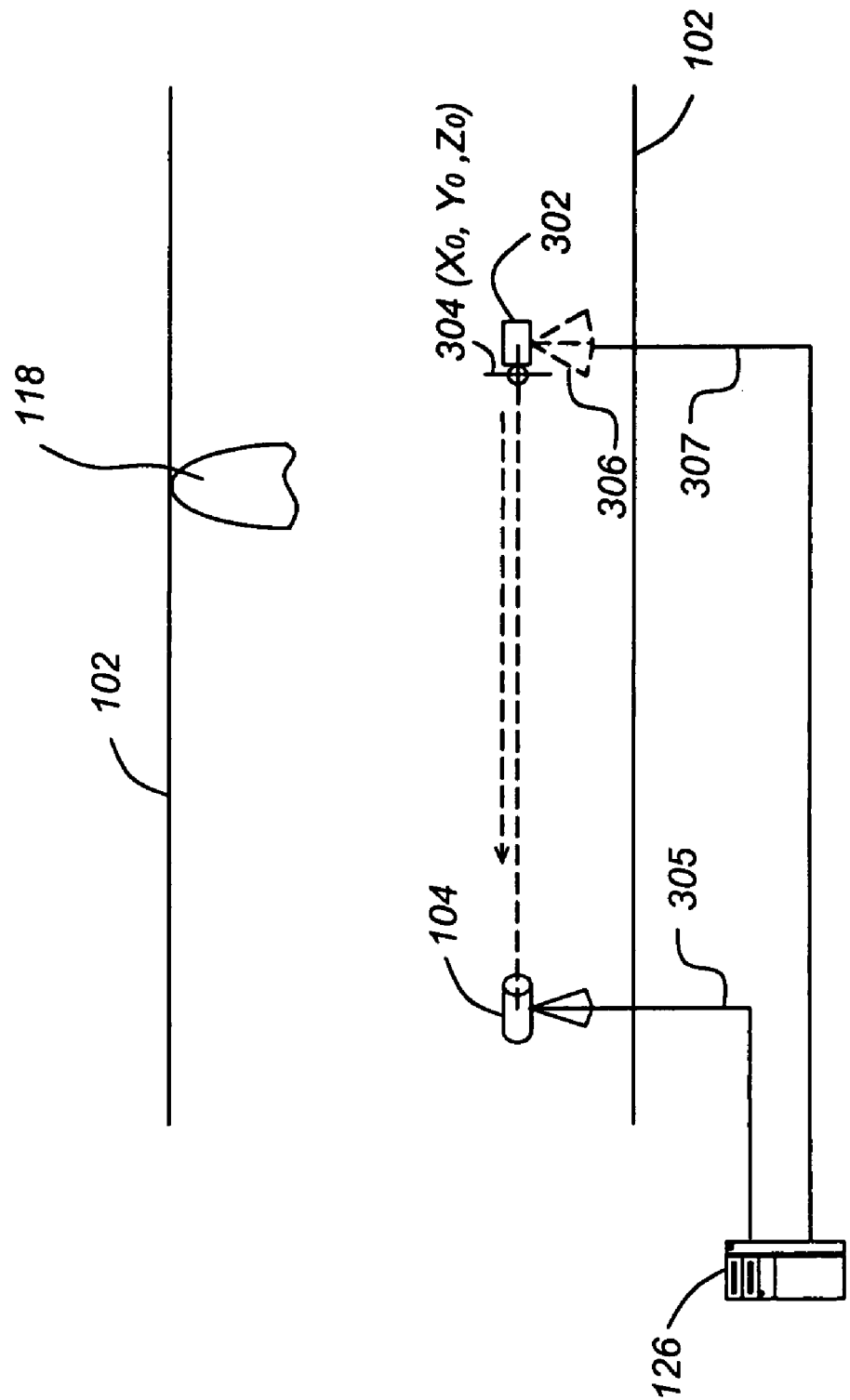
FIGS. 3A-3C are diagrams physically depicting the operations described in FIG. 2.

FIG. 3A is a drawing depicting the determination of a reference position 304 of a reference unit 302 with its integrated reflector, inside the assembly 102.

This can be accomplished in a number of ways. I one embodiment, this is accomplished by simply placing the reference unit 302 on a calibrated pedestal or other location having a known reference position $(X_0, Y_0, Z_0)$ in the coordinate reference frame $(X, Y, Z)$ 124. If the computer 126 is aware of the coordinates of this reference position 304, the reference unit 302 may simply be placed at the calibrated position. That the reference unit 302 has been placed in the reference position can be indicated by sending a message to the computer 126 via link 307, perhaps initiated by the user of the reference unit 302 activating a suitable control to provide a suitable input to the reference unit 302 or the computer 126 itself. This can also be indicated by the proximity of the reference unit 302 in the vicinity of the reference location 304, and that the reference unit 304 is stationary when in this vicinity (as measured by reflected energy from the illuminator).

The reference position 304 of the reference unit 302 can also be determined in other ways as well, for example, from illuminator energy reflected from the reference unit. In this case, the CAMS system itself determines the reference position by illuminating the reference unit 302, and determining the reference position 304 from illuminator energy reflected from the reference unit 302.

Figure 3B:
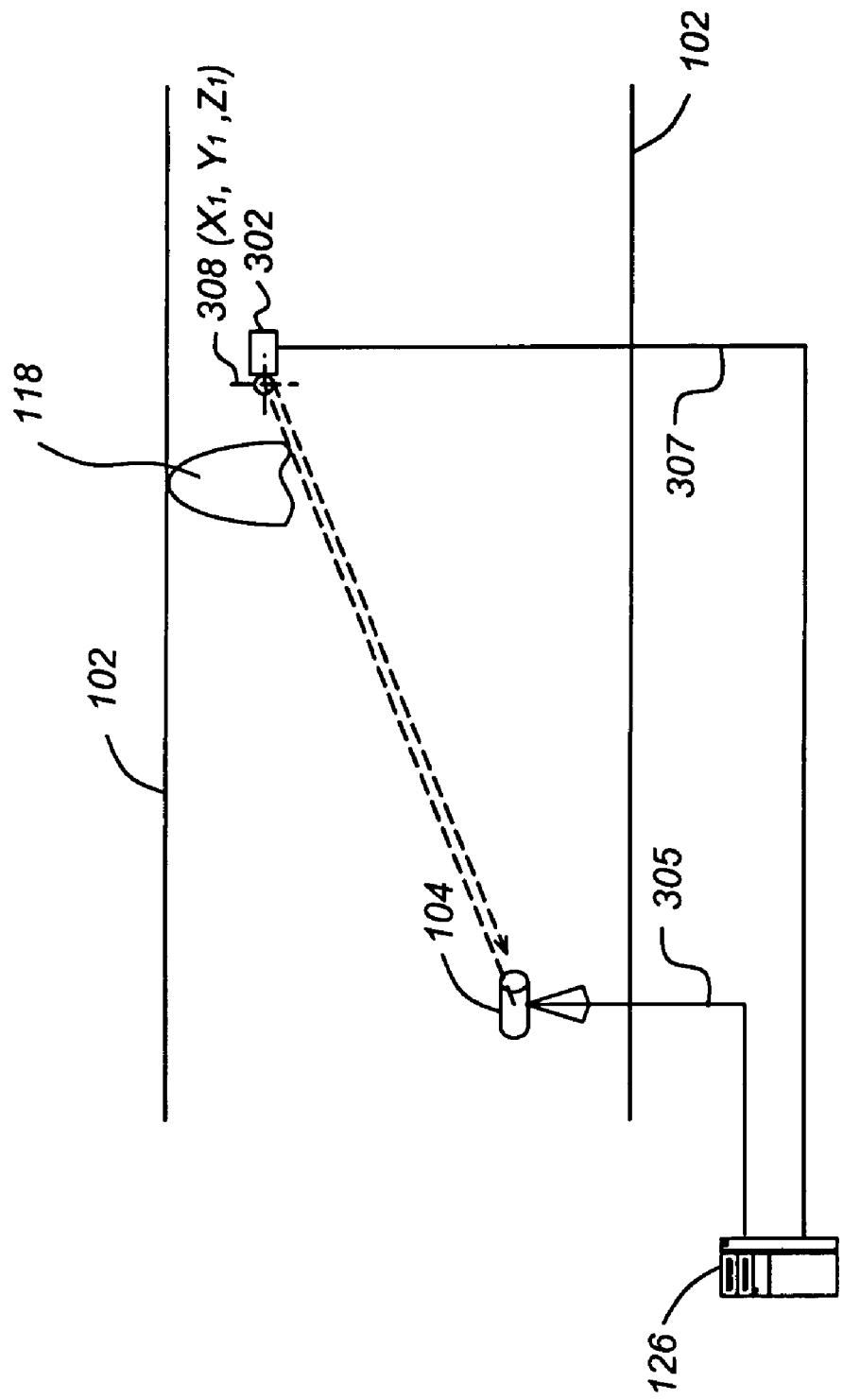
Figure 3C:
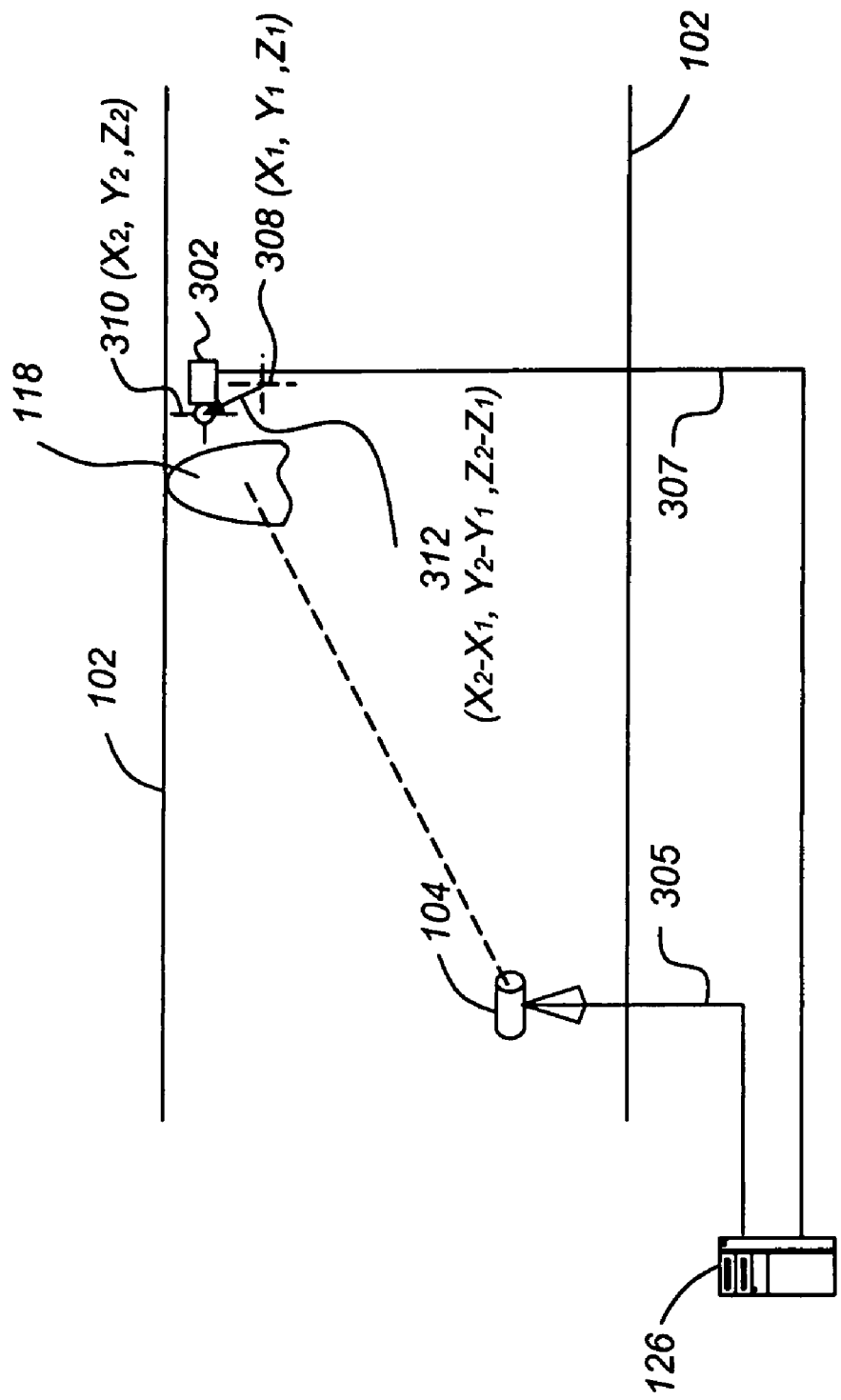

Returning again to FIG. 2 and now to FIGS. 3B and 3C, the reference unit 302 is moved from the reference position 304 to a threshold spatial position where 308 the line of sight between the reference unit 304, the illuminator 104, and the receiver 116 (in the illustration, presumed to be co-located with the illuminator, but not necessarily so) is no longer unobscured.

FIG. 3B is a diagram showing the reference unit 302 at the threshold spatial position 308, and FIG. 3C is a diagram showing the reference unit at a spatial position obscured by object 118. As the reference unit 302 is moved from its reference location 304 to the threshold reference position 308, the reference unit 302 remains illuminated by the illuminator 104, and the computer 126 can determine the precise location $(X_1, Y_1, Z_1)$ of the reference unit 302 using the techniques described above. However, as the reference unit 302 is moved from the threshold position 308 to the spatial position of interest 310, the reference unit is unilluminated by the illuminator 104 (for example, in a shadow of the illuminator), and the precise position of the reference unit 302 is ordinarily undeterminable. However, the present invention ameliorates this problem as described below.

Returing back to FIG. 2, and to FIG. 3C, a displacement 312 $(X_2-X_1, Y_2-Y_1, Z_2-Z_1)$ of the reference unit 302 is inertially measured while the reference unit 302 is unilluminated by the illuminator and moved to the spatial position of interest 310, as shown in block 206. In one embodiment, the reference unit 302 transmits these inertial measurements to the computer 126, and the computer uses this information, along with the reference position information and the position information derived from the illuminator 104 energy reflecting from the reference unit 302 to determine the spatial location of interest 310. In another embodiment, the position information derived from the reflected illuminator energy is transmitted to the reference unit 302, and the coordinates of the spatial position of interest 310 are computed therein. For example, the computer 126 may transmit the coordinates of the threshold position 308, the reference position 304, and allow the reference unit 302 to use internally generated inertial measurements to determine the coordinates of the spatial position of interest 310. The reference position 304 could be transmitted from the computer 126 to the reference unit 302, programmed into the reference unit 302, or simply pre-stored (since the coordinates of the reference position need not change and can be programmed).

Figure 4:
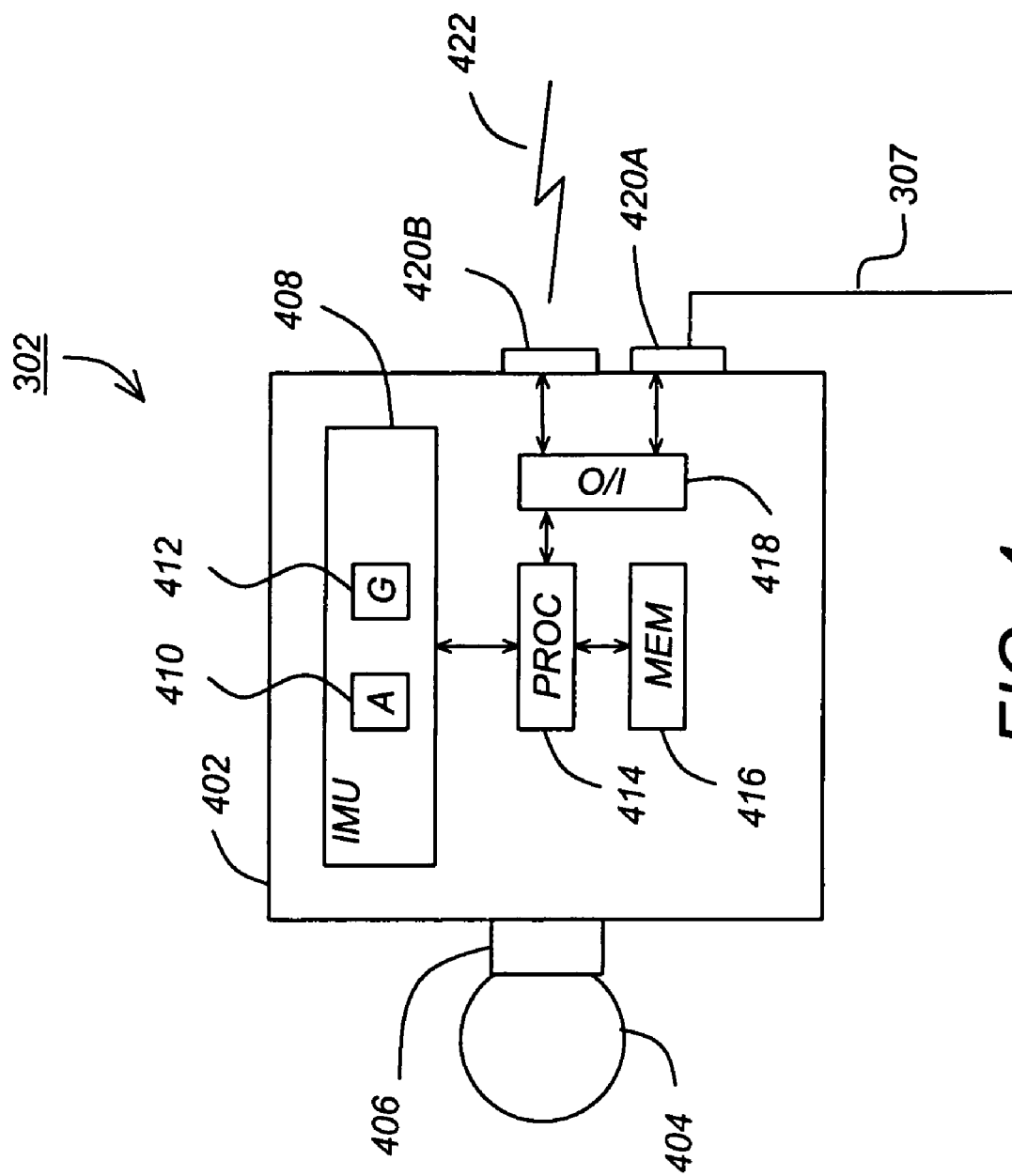
FIG. 4 is a diagram depicting a first embodiment of the reference unit.

FIG. 4 is a diagram depicting an embodiment of the reference unit 302. In the illustrated embodiment, the reference unit 302 comprises a reflector 404. The reflective surface 404 is preferably spherical, as that ensures reflection back to the source of the illumination energy. However, this need not be the case. In one embodiment, the reflector 404 is a removable laser retro-reflector. The reflector 404 may be held to the body of the reference unit 402 by a holder 406 that is configured to accept and hold the reflector 404. In one embodiment, the holder 406 is magnetic, and the reflector 404 is comprised of ferric material, allowing the reflector 404 to be held in place by magnetically generated forces and removed by overcoming these forces.

The reference unit 302 also comprises an inertial measurement unit (IMU) 408, which includes one or more accelerometers 410. Preferably, three accelerometers 410 are used to measure accelerations and to double integrate the accelerations to provide positional displacements in three orthogonal directions, the number of accelerometers can be greater or less than three. Each of the accelerometers 410 also has a sensitive axis, and the plurality of accelerometer sensitive axes are typically arranged orthogonally, but this need not be the case. The IMU 408 can perform the double integration operations using an internal processor, or can transmit the acceleration measurements to a processor 414, which performs these computations, using instructions stored in the memory 416. It is also possible to transmit the raw measurements to the computer 126, where the necessary coordinate transformations and integrations can occur.

The reference unit 302 also comprises an input-output (I/O) module 418 communicatively coupled to the processor 414. The I/O module 418 is used to exchange information with the other elements of the CAMS 100, including the computer 126. As described above, in one embodiment, reference unit 302 measurements are sent to the computer 126 where computations are performed to determine the position of the reference unit, and in another embodiment, the reference position and position measurements taken by the illuminator 104 and the receiver 116 are transmitted to the reference unit 302, and the processor 414 performs these computations.

Information transmitted between the reference unit 404 and the computer 126 can be sent and/or received via link 307 and a wired interface 420A, and/or by a wireless link 422 with the computer 126, via interface 420B. The wireless link can be IR, or radio frequency (RF). Repeaters may be required in cases where the intervening object 118 is opaque to the wavelength of the energy used in this wireless data link.

In one embodiment of the invention, the IMU 408 includes rate-sensing devices such as gyros 412, to measure angular displacements of the reference unit 302 at the appropriate times. This is because the reflector 404 and the accelerometers 410 are not co-located. For example, it is possible to move the reference unit 402 without any apparent motion of the energy reflected by the reflector 404. Such might be the case, if the reference unit 302 were rotated around an axis passing through the center of the reflector 404. Since the accelerometers 410 are not located in precisely the same position, they would measure accelerations and interpret those accelerations as a displacement of the reflector unit (and, implicitly, the reflector 404 as well). This problem can be ameliorated in two ways. First, the accelerometers can be placed close to the center of the reflector 404. In this case, angular displacements about an axis passing through this center will not result in angular acceleration measurements (or at least, measurements which are minimized). Second, the IMU 408 can be placed away from the center of the reflector 404, but augmented with a gyros 412 permitting measurement of angular displacements. Such angular displacements can be used (along with well known coordinate transformations) to correct for the rotations of the reference unit 302 that do not result in translational movement of the reflector 404. These corrections can be computed in the IMU 408, the processor 414, or the computer 126.

If desired, additional sensing components, like orthogonally arranged magnetometers, can also be included within the reference unit 302 and used to detect its movement in relation to the magnetic fields surrounding the assembly 102. This information can be used to further refine spatial measurements.

The IMU 408 can comprise microelectromechanical devices (MEMS). MEMS integrate mechanical elements, sensors, actuators, and electronics on a common silicon substrate through microfabrication technology. While the electronics are fabricated using integrated circuit (IC) process sequences (e.g., CMOS, Bipolar, or BICMOS processes), the micromechanical components can be fabricated using compatible "micromachining" processes that selectively etch away parts of the silicon wafer or add new structural layers to form the mechanical and electromechanical devices. Such devices are known in the art, as evidenced by "Honeywell Gun-Hard Inertial Measurement Unit (IMU) Development", by Drew Karnick et al, available at http://content.honeywell.com/dses/assets/datasheets/GunHardIMUpaper2.pdf.

It is possible to use the CAMS (illuminated) measurements of the receiver unit 302 position to calibrate the sensors (e.g. accelerometers 410 and optional gyros 412) in the remote unit. In this embodiment, inertially measured values are compared with measurements obtained from reflected energy in order to provide information that can be used to predict and correct for sensor limitations such as drift, scale factor non-linearities, noise.

Figure 5:
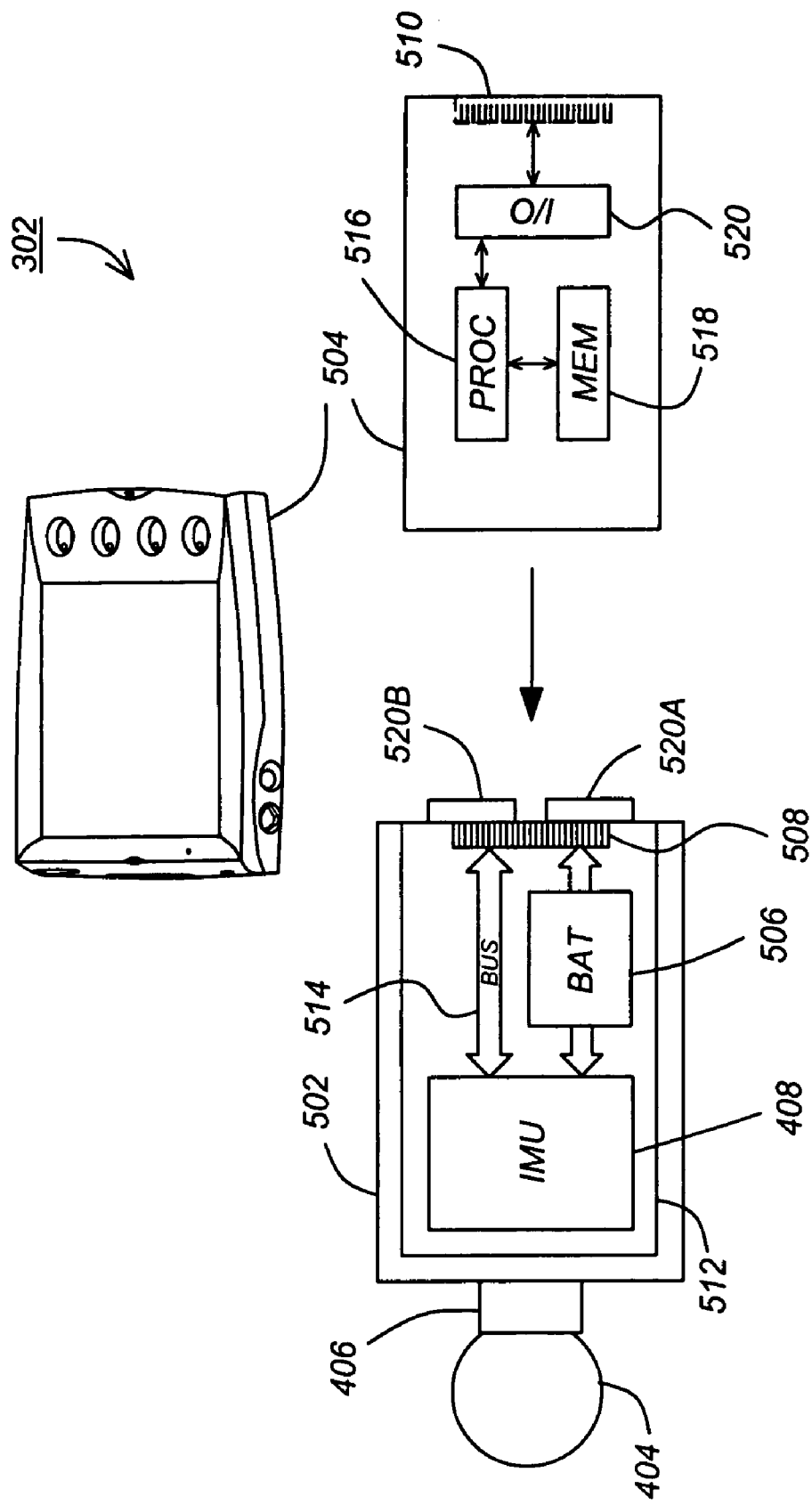
FIG. 5 is a diagram depicting a second embodiment of the reference unit.

FIG. 5 is a diagram illustrating another embodiment of the invention in this embodiment. In this embodiment, the reference unit 302 comprises an inertial positioning unit (IPU) 502 and a mobile computing device (MCD) 504 such as a personal data assistant (PDA) or handheld personal computer H/PC. The inertial positioning or sleeve unit 502 includes the reflector 404 and the holder 406, and the IMU 408.

The MCD 504 can be removably coupled to the IPU 502 such that an IPU/MCD interface 508 and an MCD/IPU interface 510 are communicatively coupled together. This permits exchange of power and information between the IPU 502 and the MCD 504. In one embodiment the IPU 502 is configured to include a cavity 512 into which the MCD 504 is (e.g. slidably) disposed, physically connecting the two devices, and disposing the IPU/MCD interface 508 in contact with the MCU/IPU interface 510, enabling information and optional power exchange by conductive pins.

Information is provided from the IMU 408 to the IPU/MCD interface 508 via bus 514, and to the MCD's processor 516 via I/O 520. Information is provided to the IMU 408 if necessary by the same or analogous signal path.

In one embodiment, the processor 516 communicates with the computer 126 via I/O 520, MCD/IPU interface 510, IPU/MCD interface 508, and either a wired interface 520A with the computer 126, or a wireless interface 520 with the computer. However, this need not be the case. Instead, the IPU may include its own processor which can transceive, process, and/or format information obtained from the IMU 408 and the MCD processor 516. In such an embodiment communication from the MCD 504 to the computer 126 would be accomplished via the I/O interface 520, MCD/IPU interface 510, IPU/MCD interface 508 to the processor in the IPU 502, and thence to the wireless/wired interface 520.

The sleeve unit 502 may also comprise a battery 506 that can be used to provide power to the appropriate elements of both the IPU 502 and the mobile computing device 504. Alternatively, power may be provided by the mobile computing device 504 to the sleeve unit 502, or can be provided via a cable or wire.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while a reference position 304, threshold position 308 and a position of interest 310 are described above, the reference position can simply be viewed as the threshold position 308, particularly if the CAMS 100 is capable of determining the position of the reference unit 302 at that location with adequate precision. Further, while the "unilluminated" status of the reflector may be due to placement behind an opaque object, the foregoing technique can be employed when the reflective object is unilluminated for other reasons. For example, in the laser tracking embodiment, the inertial data can be used to determine position during intervals when the laser tracker attempting to reacquire the retro-reflector, and may even be transmitted to the computer to assist the laser tracker in finding and reacquiring the reflector. The inertial data may also be used to provide information regarding the attitude of the reflector, to provide position or rate information to augment that which is determined using the illuminator.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of determining a first position of interest in an assembly, comprising the steps of:
    determining a reference position of a reference unit;
    moving the reference unit from the reference position to the first position in the assembly and inertially measuring a displacement of the reference unit while the reference unit is unilluminated by an illuminator; and
    determining the first position in the assembly from the reference position, illuminator energy reflected from the reference unit, and the inertially measured displacement of the reference unit.

2. The method of claim 1, wherein the step of determining a reference position of the reference unit comprises the step of placing the reference unit in a known reference position.

3. The method of claim 1, wherein the reference position is determined from illuminator energy reflected from the reference unit.

4. The method of claim 1, wherein the step of determining a reference position of the reference unit comprises the steps of:
    illuminating the reference unit; and
    determining the reference position from illuminator energy reflected from the reference unit.

5. The method of claim 1, wherein the displacement is inertially measured by inertial sensors.

6. The method of claim 1, wherein the inertial sensors include an accelerometer.

7. The method of claim 1, wherein the step of determining the first position from the reference position, illuminator energy reflected from the reference unit, and the inertially measured displacement of the reference unit comprises the steps of:
    determining the inertially measured displacement of the reference unit;
    transmitting the inertially measured displacement of the reference unit to a processor; and
    determining, in the processor, the first position from the reference position, the illuminator energy reflected from the reference unit, and the inertially measured displacement of the reference unit.

8. The method of claim 1, wherein the step of determining the first position from the reference position, illuminator energy reflected from the reference unit, and the inertially measured displacement of the reference unit comprises the steps of:
    receiving the reference position from a processor remote from the reference unit;
    receiving a second displacement of the reference unit, the second displacement determined from the illuminator energy reflected from the reference unit while the reference unit is illuminated by the illuminator; and
    determining, in the reference unit, the first position from the received reference position, the second displacement, and the inertially measured displacement of the reference unit.

9. The method of claim 1, wherein the step of determining the first position from the reference position, illuminator energy reflected from the reference unit, and the inertially measured displacement of the reference unit comprises the steps of:
    receiving a second displacement of the reference unit, the second displacement determined from the illuminator energy reflected from the reference unit while the reference unit is illuminated by the illuminator; and
    determining the first position from the received reference position, the second displacement, and the inertially measured displacement of the reference unit.

10. A reference unit for determining a first spatial position in an assembly, comprising:
    an inertial measurement unit;
    a reflector for reflecting energy from an illuminator; and
    a communications interface communicatively coupled to the inertial measurement unit, for communicating information between the reference unit and a processor controlling the illuminator.

11. The apparatus of claim 10, wherein the information includes an displacement of the reference unit from a reference position to the first spatial position as measured by the inertial measurement unit, and wherein the processor computes the first spatial position from the reference position and the displacement of the reference unit from the reference position.

12. The apparatus of claim 10, wherein the information includes the reference position and wherein the reference unit computes the first spatial position from the reference position and the displacement of the reference unit from the reference position.

13. The apparatus of claim 10, wherein the information includes a displacement of the reference unit from a first unilluminated position to the first spatial position.

14. The apparatus of claim 10, wherein:
    the information includes a displacement of the reference unit when unilluminated by the illuminator; and
    the processor computes the first spatial position from a reference position, the reflected energy, and a displacement of the reference unit as measured by the inertial measurement unit while the reference unit is unilluminated by the illuminator.

15. The apparatus of claim 10, wherein:
the information includes a first displacement of the reference unit determined from the illuminator energy reflected from the reference unit while the reference unit is illuminated by the illuminator; and
the reference unit comprises a second processor for computing the first spatial position from a reference position, the first displacement, and a second displacement of the reference unit as measured by the inertial measurement unit while the reference unit is unilluminated by the illuminator.

16. The apparatus of claim 10, wherein the reference unit comprises:
a handheld computing device (HCD) having an HCD data interface;
a inertial positioning unit (IPU) which includes the inertial measurement unit and the reflector, the IPU further including an IPU interface configured to be communicatively coupled to the HCD data interface.

17. The apparatus of claim 10, wherein the illuminator is a laser ranging device.

18. The apparatus of claim 10, wherein the inertial measurement unit is disposed within the reflector.

19. The apparatus of claim 10, wherein the inertial measurement unit includes a plurality of accelerometers and a plurality of gyros.

20. An apparatus for determining a first spatial position of a component in an assembly opaque to energy from an illuminator, comprising:
means for determining a reference position of a reference unit;
means for inertially measuring a displacement of the reference unit while the reference unit is moved from the reference position to the first spatial position and the reference unit is unilluminated by an illuminator; and
determining the first position from the reference position, illuminator energy reflected from the reference unit, and the inertially measured displacement of the reference unit.

21. The apparatus of claim 20, wherein the means for determining a reference position of the reference unit comprises a means for placing the reference unit in a known reference position.

22. The apparatus of claim 20, wherein the reference position is determined from illuminator energy reflected from the reference unit.

23. The apparatus of claim 20, wherein the means for determining a reference position of the reference unit comprises:
means for illuminating the reference unit; and
means for determining the reference position from illuminator energy reflected from the reference unit.

24. The apparatus of claim 20, wherein the displacement is inertially measured by an inertial sensors.

25. The apparatus of claim 20, wherein the inertial sensors include an accelerometer.

26. The apparatus of claim 20, wherein the means for determining the first position from the reference position, illuminator energy reflected from the reference unit, and the inertially measured displacement of the reference unit comprises:
means for determining the inertially measured displacement of the reference unit;
means for transmitting the inertially measured displacement of the reference unit to a processor; and
means for determining, in the processor, the first position from the reference position, the illuminator energy reflected from the reference unit, and the inertially measured displacement of the reference unit.

27. The apparatus of claim 20, wherein the means for determining the first position from the reference position, illuminator energy reflected from the reference unit, and the inertially measured displacement of the reference unit comprises:
means for receiving the reference position from the computer;
means for receiving a second displacement of the reference unit, the second displacement determined from the illuminator energy reflected from the reference unit while the reference unit is illuminated by the illuminator; and
means for determining, in the reference unit, the first position from the received reference position, the second displacement, and the inertially measured displacement of the reference unit.

28. The apparatus of claim 20, wherein the means for determining the first position from the reference position, illuminator energy reflected from the reference unit, and the inertially measured displacement of the reference unit comprises:
means for receiving the reference position from the computer;
means for receiving a second displacement of the reference unit, the second displacement determined from the illuminator energy reflected from the reference unit while the reference unit is illuminated by the illuminator; and
means for determining, in the reference unit, the first position from the received reference position, the second displacement, and the inertially measured displacement of the reference unit.

* * * * *